United States Patent
Silas et al.

(10) Patent No.: US 9,729,863 B2
(45) Date of Patent: Aug. 8, 2017

(54) GENERATING CONTENT BASED ON SHOT AGGREGATION

(71) Applicant: Pixar, Emeryville, CA (US)

(72) Inventors: Matt Silas, Berkeley, CA (US); Sarah Shen, Berkeley, CA (US); Tom Hahn, Piedmont, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 14/818,192

(22) Filed: Aug. 4, 2015

(65) Prior Publication Data

US 2017/0041590 A1    Feb. 9, 2017

(51) Int. Cl.
*H04N 13/02* (2006.01)
*G06T 13/40* (2011.01)
*H04N 5/232* (2006.01)

(52) U.S. Cl.
CPC ......... *H04N 13/0296* (2013.01); *G06T 13/40* (2013.01); *H04N 5/23216* (2013.01); *H04N 13/0207* (2013.01)

(58) Field of Classification Search
CPC ........... H04N 13/0296; H04N 5/23216; H04N 13/0207; G06T 13/40
See application file for complete search history.

(56) References Cited

U.S. PATENT DOCUMENTS

| | | | |
|---|---|---|---|
| 6,686,918 B1 * | 2/2004 | Cajolet | G06T 13/00 345/419 |
| 6,928,613 B1 * | 8/2005 | Ishii | G11B 27/034 715/716 |
| 8,161,452 B2 * | 4/2012 | Creighton | G06F 8/10 348/700 |
| 8,253,728 B1 * | 8/2012 | Sullivan | G06T 19/00 345/419 |
| 8,363,055 B1 * | 1/2013 | Gregory | G06T 13/00 345/473 |
| 9,106,812 B1 * | 8/2015 | Price | H04N 1/212 |

(Continued)

OTHER PUBLICATIONS

Toon Boom, Storyboard Pro 4.1 User Guide, URL: http://docs.toonboom.com/download/storyboard-pro/4.1/SBP41_User_Guide.pdf, Sep. 9, 2013, pp. 1-534.*

*Primary Examiner* — Jacinta M Crawford
*Assistant Examiner* — Phuc Doan
(74) *Attorney, Agent, or Firm* — Patterson + Sheridan, LLP

(57) ABSTRACT

This disclosure provides an approach for aggregating elements that are common across shots in the rendering of image frames. In one embodiment, common elements are aggregated via a scene editor which stores the common elements in a scene layer, which is an asset that is a container for elements such as characters, locations, and the like that are common across shots. The scene layer permits new shots to be created that inherit the common elements, rather than from scratch or by manually copying elements from other shots. The scene editor may further receive elements specific to particular shots and store such elements in shot layers that are created on top of the scene layer and store differences from the scene layer. A rendering application then renders image frames on a shot-by-shot basis using the common elements stored in the scene layer and the shot-specific elements stored in the shot layers.

20 Claims, 4 Drawing Sheets

(56) References Cited

U.S. PATENT DOCUMENTS

| | | | | |
|---|---|---|---|---|
| 2002/0175917 A1* | 11/2002 | Chakravarty | ........ | G11B 27/034 345/473 |
| 2005/0253839 A1* | 11/2005 | Bugaj | ..................... | G06T 15/00 345/418 |
| 2007/0146360 A1* | 6/2007 | Clatworthy | ............. | G06T 15/20 345/419 |
| 2008/0007567 A1* | 1/2008 | Clatworthy | ............ | G06Q 30/02 345/619 |
| 2010/0225648 A1* | 9/2010 | Katsambas | ............. | G06T 13/00 345/427 |
| 2010/0265250 A1* | 10/2010 | Koenig | .................. | G06T 13/00 345/419 |
| 2013/0151970 A1* | 6/2013 | Achour | ................ | H04N 21/854 715/723 |
| 2014/0378222 A1* | 12/2014 | Balakrishnan | ....... | H04N 5/2224 463/31 |
| 2015/0105155 A1* | 4/2015 | Hardy | .................. | G06T 19/006 463/31 |

* cited by examiner

GENERATING CONTENT BASED ON SHOT AGGREGATION

BACKGROUND

Field of the Invention

This disclosure provides techniques for rendering image frames. More specifically, this disclosure presents techniques for generating rendered content based on shot aggregation.

Description of the Related Art

Computer animation film studios have sometimes relied on a shot-based production pipeline in which the unit of work that travels down the pipeline is a shot. A shot is a continuous run of a virtual camera that typically includes a number of image frames. One department in the film studio may define the blocking and cinematography in a shot from storyboard images, after which the shot travels down the production pipeline to other departments that are responsible for detailed animation, lighting, and effects, among other things.

The shot is a particularly useful unit of work for animators and effects artists, who can add detailed animations and effects one shot at a time. However, shots are traditionally uncoordinated and distinct from each other. As such, attributes of one shot cannot easily be propagated to another shot. Instead, each shot is typically created from scratch or by manually copying elements from one shot in an existing file to another shot in a new file, which tends to be tedious and inefficient.

SUMMARY

One embodiment provides a computer-implemented method for rendering image frames of three-dimensional (3D) geometry. The method generally includes storing a selection of elements common to a plurality of shots in a scene layer, where each shot includes multiple image frames from a continuous run of a virtual camera, and where a scene includes a collection of shots with at least a character and a locale in common. The method further includes, for at least one of the plurality of shots, storing a selection of elements specific to the shot in a respective shot layer. In addition, the method includes rendering image frames in each of the shots based on the stored common elements and the stored elements specific to the shot.

Further embodiments include a non-transitory computer-readable storage medium storing instructions that when executed by a computer system cause the computer system to perform the method set forth above, and a computer system programmed to carry out the method set forth above.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

This disclosure presents techniques for aggregating elements that are common across shots in the rendering of image frames. In one embodiment, the common elements are aggregated via a scene editor which stores the common elements in a scene layer. As used herein, a "scene" is a collection of shots that have character(s) and a locale in common, and possibly continuity of time as well. The scene layer is an asset which provides a container for elements such as characters, locations, and the like that are common across shots. By storing user-defined common elements in the scene layer, new shots may be created that inherit the common elements, rather than from scratch or by manually copying elements from other shots. The scene editor is further configured to receive selections of elements specific to particular shots and store such shot-specific elements in shot layers. Each shot layer exists on top of a scene layer and stores differences from the underlying scene layer, such as the virtual camera used for the particular shot and shot-specific changes (e.g., cheats or character modifications). A rendering application may ultimately render image frames of a computer animation film on a shot-by-shot basis using the common elements stored in the scene layer and the shot-specific elements stored in the shot layers.

Figure 1:
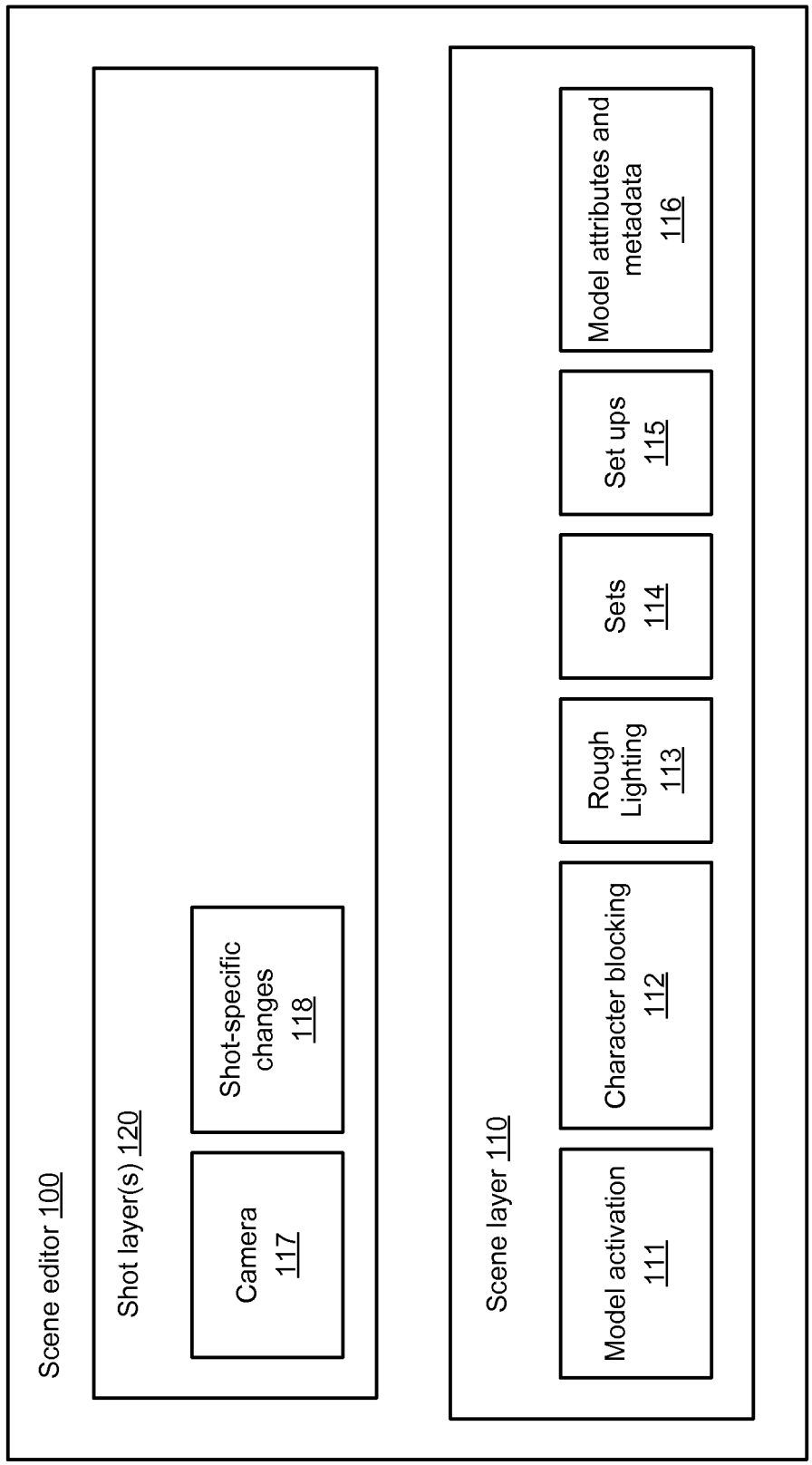
FIG. 1 illustrates components of a scene editor used to aggregate elements common across shots, according to an embodiment.

FIG. 1 illustrates components of a scene editor 100 used to aggregate elements common across shots, according to an embodiment. Although depicted as a stand-alone component, the scene editor 100 may also be a component of an application. For example, the scene editor 100 may be part of a larger animated film editing application that includes one or more of a viewer that allows a user to look through a virtual camera, a blocking editor that allows the user to change the blocking of characters, a timeline tool that allows the user to move a playhead through multiple shots, a catalog of models that the user can add to a scene, a browser (tree-view) that shows a list of components currently making up the scene, among other things.

The scene editor 100 is generally configured to manage scenes that each includes one or more shots. The scene editor 100 allows a user to create new shots and access and move between shots, while keeping track of the relationships shots have with each other and with scenes and maintaining user specified elements in a layer-based representation that permits common elements to be shared across shots. As shown, the scene editor 100 maintains a scene layer asset 110 that stores elements common across shots, as well as shot layer(s) 120$_i$ on top of the scene layer 110 that store elements specific to respective shots. The user may interact with characters and objects as if he or she were working with a single shot, and the scene editor 100 may automatically route data for common elements in the shot to a scene layer and scene-specific elements to a shot layer for storage.

Illustratively, elements of the scene layer include model activation 111, character blocking 112, rough lighting 113, sets 114, set ups 115, and model attributes and metadata 116. Model activation 111 refers to the activation or deactivation of models the user intends to be present in or missing from the scene, respectively. For example, in a scene that takes place in an office, models for characters present in the office may be activated. Conversely, other models that are not relevant to the office may be deactivated and not appear in the scene.

Character blocking 112 includes the position and movement of characters in the scene, such as the characters' pose, facial expression, and anything else that is mutable over time for the characters. For example, in a scene depicting a basketball game, the character blocking 112 may define the movement of the basketball players during the game. This is to be distinguished from animation, which as used herein refers to the animation of finer movement details such as the dribbling of the ball in the basketball players' hands. However, it should be understood that there is no clear-cut distinction between character blocking and animation, and the scene layer 110 may also store character animation data which is common across shots.

Rough lighting 113 refers to the basic lighting setup for virtual lighting applied to the scene. For example, rough lighting 113 may include virtual light sources and parameters associated therewith such as position, orientation, light color, light intensity, spot angle, and the like.

Sets 114 include environmental elements in the scene, such as buildings, rooms, objects, and the like. Set ups 115 include user-defined relationships between characters or objects in the scene. For example, in a scene with a character riding a horse, the constraint relationship between the character and the horse defining the location of the character on top of the horse would be a setup of the scene.

Model attributes and metadata 116 refers to attributes of the model that may change over time and metadata that does not change over time but defines how the model appears in the scene. Attributes may include animated variables. For example, a door may have an "open" attribute that the user can set over time to animate the door opening. Metadata may include variants of a model. For example, a character may have two variants: withHat and withoutHat.

As shown, elements of the shot layer 120 include virtual cameras 117 and shot-specific changes 118. As with physical cameras, virtual cameras 117 provide windows into the scene and define the composition of the shot. When a user creates a new shot, the user also needs to define the virtual camera used to capture that shot. For example, the user may specify virtual camera parameters such as camera position, orientation, lens type, f-stop, focal length, and the like which are then stored in the shot layer 120.

Shot-specific changes 118 may include any feasible changes to the common elements that are specific to one or more shots. Shot-specific cheated positions of characters and modifications to characters are examples of shot-specific changes 118. As used herein, a "cheat" refers to any change to a character or set piece that is made relative to a particular virtual camera. For example, in a scene in which two characters are facing each other and the virtual camera looks over the shoulder of one character, the position of that character may be cheated by moving the character aside, thereby revealing the other character more fully. That is, the first character's position is moved in the shot relative to the common character blocking for the scene. Such a cheat, along with other shot-specific changes such as modifications to characters, are stored in the shot layer 120 for the particular shot. The scene editor's user interface, an example of which is discussed below with respect to FIG. 2, may provide indicators showing which elements are part of the common scene layer and which are specific to an individual shot's layer.

When a new shot is created, the shot may be automatically or manually associated with a scene, and the common elements 111-116 of the scene layer would then be inherited by the shot layer that is created for the new shot. As a result, the user does not need to recreate the shot or manually copy and paste elements from another shot. Instead, the user may simply make shot-specific changes such as moving the virtual camera for the new shot to a desired position. That is, by essentially decoupling the virtual camera that is specific to each shot, and other shot-specific changes, from the remaining elements that are typically common across shots in a scene, the scene editor 108 permits the user to create new shots by defining the virtual camera for the new shot and making shot-specific changes, if any, while reusing already existing scene layer elements that were previously used in other shots of the scene. It should also be understood that changes to the scene layer are propagated to all of the shots in the scene, so that the user would not need to manually copy and paste changed elements from one shot to another even after the shots are created.

For example, assuming a user wishes to create three shots of a character running down a corridor and making a turn into a second corridor: a shot of the character running down the first corridor; a shot of the character running down the second corridor, and a shot from a security camera that captures the entire running sequence in both corridors. Under the traditional shot-based approach, the user would need to create each shot separately, activate the character and other models in each shot, and copy the remaining elements such as character blocking from one shot in which the elements are defined to other shots in which the same elements are desired. This is the case even though most of the elements would be common to all three shots. After copying the common elements, the user would set up the virtual camera for each of the shots to capture the desired running sequence in each shot. In contrast, the scene editor 100 maintains scene level elements that are common to a collection of shots in the scene layer 110. As a result, the user may create shots in a scene by defining the virtual camera, characters, blocking, etc. for a first shot, with the common elements (e.g., characters and blocking) stored in a scene layer and the shot-specific elements (e.g., virtual camera) stored in a corresponding shot layer. When the user moves on to a second shot that is associated with the same scene, the common elements are automatically inherited from the scene layer, and the user only needs to define the virtual camera and other shot-specific elements of the second shot.

A rendering application (not shown) may render image frames of a shot using the common elements 111-116 of the scene layer and the elements of the shot layer 120. The virtual camera 117 of the shot layer 120 captures the scene having the sets 114, models 111, model attributes 116, rough lighting 113, and set ups 115 that are stored in the scene layer 110, as modified by the shot-specific changes such as cheats and modifications to characters that are stored in the shot layer 120.

Figure 2:
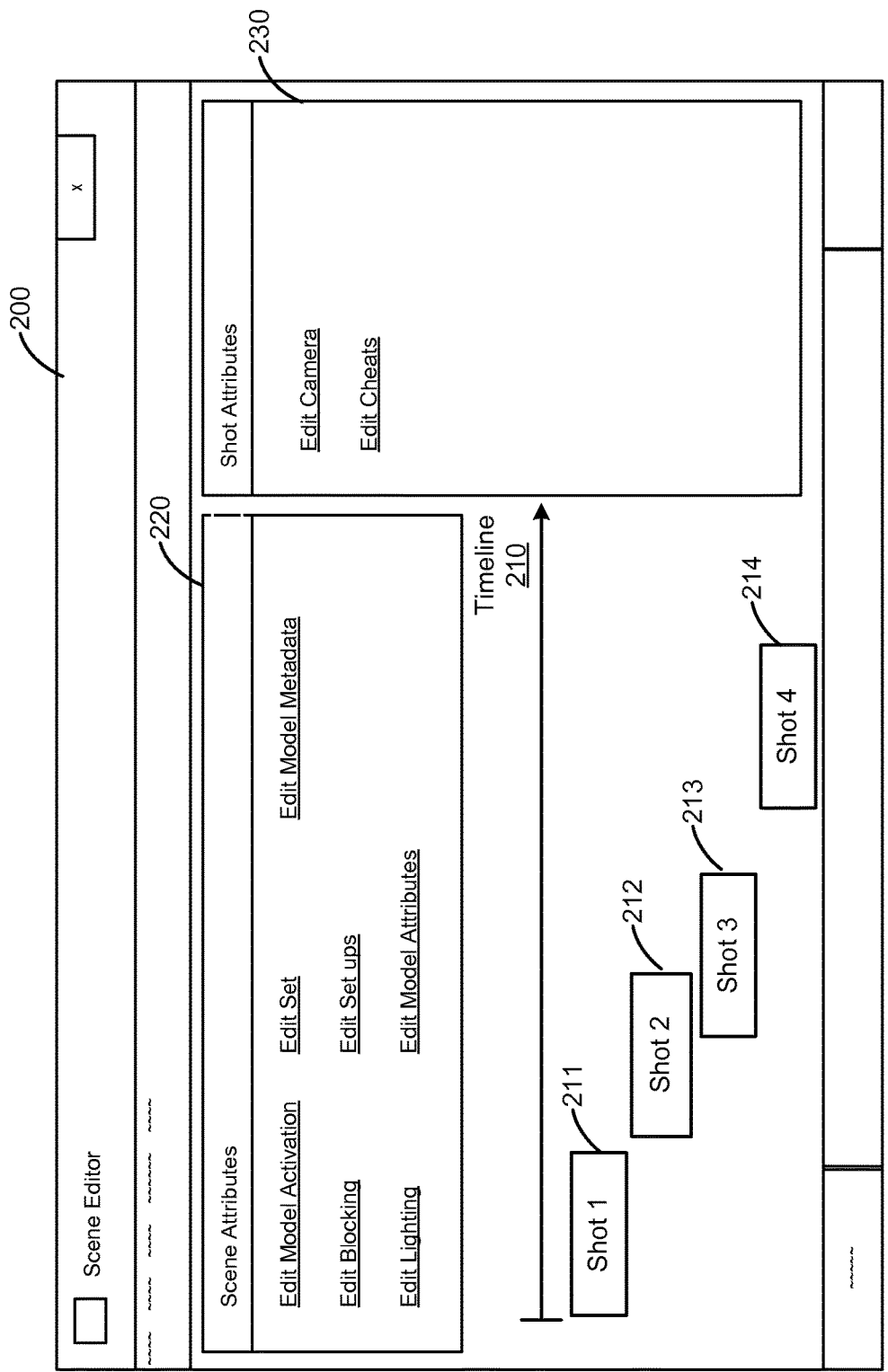
FIG. 2 illustrates an example scene editor user interface, according to an embodiment.

FIG. 2 illustrates an example scene editor user interface 200, according to an embodiment. As shown, the user interface 200 includes a timeline 210 and representations of shots 211-214 on the timeline 210. Such a user interface 200 permits the user to define frame ranges of shots. In general, a shot may be of an arbitrary length of time and potentially overlap with other shots. The user interface 200 permits the user to visualize all of the shots 211-214 and their relation to one another in the linear context of the timeline 210. This differs from traditional shot-based techniques, in which the user would be provided with a list of individual shots and have to manually build a playlist from the shots to visualize them in order. In addition, each frame that has animation data or is a keyframe may be marked distinctly in the timeline 210 so that the user can quickly identify important frames.

In one embodiment, the shots 211-214 may be automatically generated from mark-ups made to a storyboard movie file. In such a case, each of the blocks 211 may stand for an amount of time for a shot determined based on the mark-ups. For example, a user may go through an animated storyboard movie file (e.g., a quicktime file) and add markers defining the beginning and ending frames of shots. Such markers are well-known and typically added to allow a viewer to jump to specific points in a movie file. After the markers are added defining the shots, the scene editor may import the marked-up storyboard and create a shot layer for each shot based on the beginning and ending frames for the shot specified by the markers. That is, marking up the storyboard yields shots, which may then be manually or automatically associated with scenes. For example, a user may select one or more shots and call them a scene, thereby associating the shot layers with a new shared scene layer that is created for the scene.

After the shots are created and associated with one or more scenes, the user may then proceed to a first shot and set up the virtual camera, characters, blocking, etc. for that shot. Elements common to the scene to which the first shot belongs, such as the characters and blocking, are then stored in the scene layer, whereas shot-specific elements such as the virtual camera are stored in the shot layer for the first shot. Examples of virtual camera parameters that may be stored in the shot layer include virtual camera position, orientation, lens type, f-stop, focal length, and the like. When the user continues to a second shot, a third shot, etc. in the same scene, the shot layer for those later shots already inherits the common elements previously stored in the scene layer, and the user can focus on the virtual camera and other shot-specific elements of the later shots. Similarly, if the user moves a shot that occurs at point A in time to point B in time, common elements such as characters in the scene and blocking are inherited by the moved shot such that the user does not need to recreate those elements and can simply edit shot-specific elements such as the virtual camera for capturing the scene at point B in time.

Illustratively, the scene editor user interface 200 includes a panel 220 for editing elements common to the scene and another panel 230 for editing elements specific to shots. In another embodiment, the same editor may be used to edit both scene and shot data, with the user switching modes on the attribute/avar to make edits to each. In the scene-edit mode, values would be authored to the scene layer, whereas in the shot-edit mode, the values would be edited in the shot layer.

As discussed, elements common to the scene may include model activation, character blocking, rough lighting, sets, set ups, and model attributes and metadata. The scene editor panel 220 depicts such common elements in a scene and may further allow the user add or modify common elements. In contrast, the panel 230 for editing elements specific to shots may allow the user to modify the virtual camera for the shot and make other shot-specific changes. Illustratively, the first shot has been selected, as indicated by the highlighting of the icon 211. In turn, the panel 230 permits the user to select, and thereafter modify, the virtual camera and shot-specific changes for the first shot. For example, the user may click on a cheated property and the panel 230 itself or a pop-up may show how the property is different from the original scene and permit the user to modify the cheated property. As discussed, elements common to a scene such as characters and blocking are automatically inherited by the shots that make up the scene. Various mechanisms may be implemented for overriding such common elements to create shot-specific properties. For example, the user may right-click on a character depicted in panel 220 and select a shot-edit mode option and also select a particular shot, after which the user may define a cheat of the character's position for the particular shot and the scene editor may then store the cheat in the associated shot layer.

Figure 3:
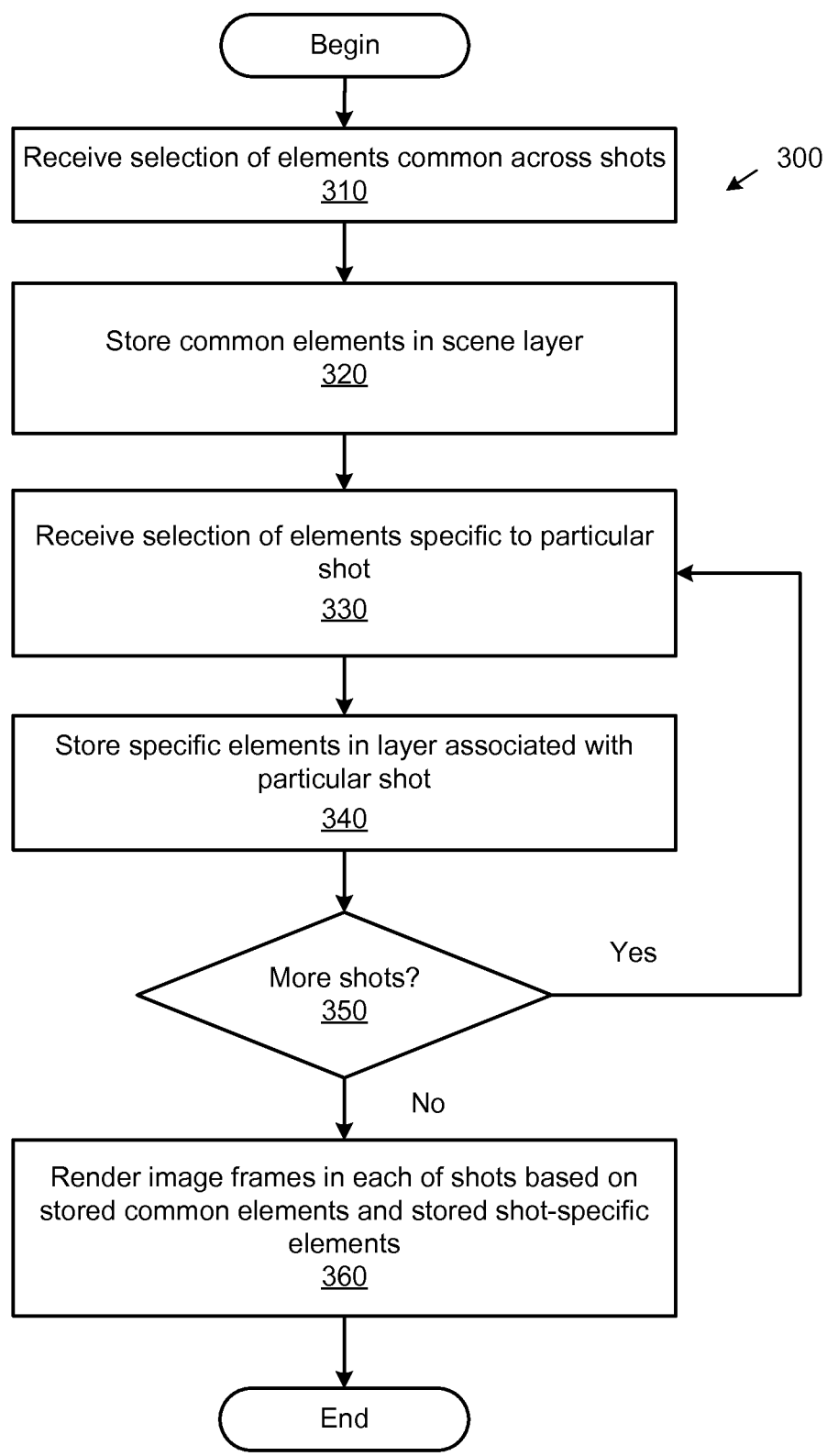
FIG. 3 illustrates a method for aggregating elements common to shots, according to an embodiment.

FIG. 3 illustrates a method 300 for aggregating elements common to shots, according to an embodiment. As shown, the method 300 begins at step 310, where the scene editor receives a selection of elements common across shots. As discussed, the shots themselves may be created by, e.g., importing a marked-up storyboard file. Thereafter, a user may work on the shots to add characters, define blocking, etc. Elements common across shots may include model activation, character blocking, rough lighting, sets, set ups, and model attributes and metadata, among other things. When working on a shot, a user may select common elements via any feasible means, such as the scene editor user interface 200 discussed above with respect to FIG. 2. As discussed, the common elements that are selected may be automatically inherited by other shots in the same scene so that other shots in the scene do not need to be recreated from scratch.

At step 320, the scene editor stores the selection of common elements in a scene layer. As discussed, the scene layer is an asset that is a container for elements such as characters, objects, terrain, rough lighting, locations, and the like that are common across shots. It should be understood that a scene is not distinct from shots but is instead a collection of shots that have character(s) and a locale in common, and possibly continuity of time as well. A scene may be created by selecting one or more shots and calling them the scene, after which the scene editor creates a scene layer to store elements common across the shots in the scene.

By aggregating elements common across shots in the scene layer, the scene editor permits the user to create shots by simply defining the virtual camera and shot-specific changes to use in conjunction with common elements that already exist in the scene layer and are automatically inherited by new shots in the same scene. As previously noted, the scene layer may or may not be explicitly shown to the user. That is, the scene layer may be a representation used by the scene editor that the user is not aware of in one embodiment. Alternatively, the scene layer may be explicitly depicted in, e.g., the scene editor user interface so that the user is aware of the scene layer and shot layers above the scene layer.

In one embodiment, the user may proceed from shot to shot after the shot and scene layers are created. As the user sets up the virtual camera, characters, blocking, etc. for one shot, the scene editor promotes elements common to the scene such as the characters and blocking to the scene layer. When the user continues to a second shot in the same scene, the shot layer for the second shot already inherits the common elements previously promoted to the scene layer. As a result, the user does not need to recreate those common elements and can instead focus on shot-specific elements of the second shot. Of course, if the user chooses to modify the common elements in any of the shots, such modifications would also be promoted to the scene layer and thereafter inherited by all of the shots in the scene.

At step 330, the scene editor receives a selection of elements specific to a particular shot. It should be understood that, although depicted as coming after receiving and storing a selection of common elements 310-320, the selection and storage of shot-specific elements may occur both after and before (or both) some common elements are selected and stored. Shots themselves may be automatically generated from mark-ups made to a storyboard movie file in one embodiment. The elements specific to a shot may include the virtual camera used and shot-specific changes such as character cheats and modifications. These shot-specific elements are not shared across shots, in contrast to the common elements shared by multiple shots and inherited from the scene layer. As a result, the user may select common elements such as characters and blocking for only one shot, with the common elements being thereafter stored in the scene layer and inherited by other shots in the scene, but the user may further need to select shot-specific elements, such as the virtual camera, for each individual shot. In a particular embodiment, the user may utilize an interface such as the user interface 200 discussed above with respect to FIG. 2 to select elements specific to shots.

At step 340, the scene editor stores the specific elements in a layer associated with the particular shot. As discussed, each shot layer is a layer on top of a scene layer that stores differences from the underlying scene layer for a particular shot. In one embodiment, the differences may include elements such as the virtual camera and shot-specific changes such as character modifications and cheats that are specific to each shot.

At step 350, if there are more shots, then the method 300 returns to step 330, where the scene editor receives a selection of elements specific to another shot. Such elements would then be stored in yet another shot layer that stores differences from the underlying scene layer, similar to step 340.

If there are no additional shots, then the method 300 continues to step 360, where image frames in each of the shots are rendered based on the stored common elements and the stored elements specific to the shot. Of course, the scene layer and/or the shot layers may also be edited further before the shots are rendered. For example, lighting, detailed animation, effects, and the like may be added as the scene consisting of the collection of shots passes through the production pipeline. A rendering application may ultimately render one or more of the shots using the common elements in the scene layer and the shot-specific elements in the respective shot layers, as well as the animation, rough lighting, effects, etc. that may also be added.

Figure 4:
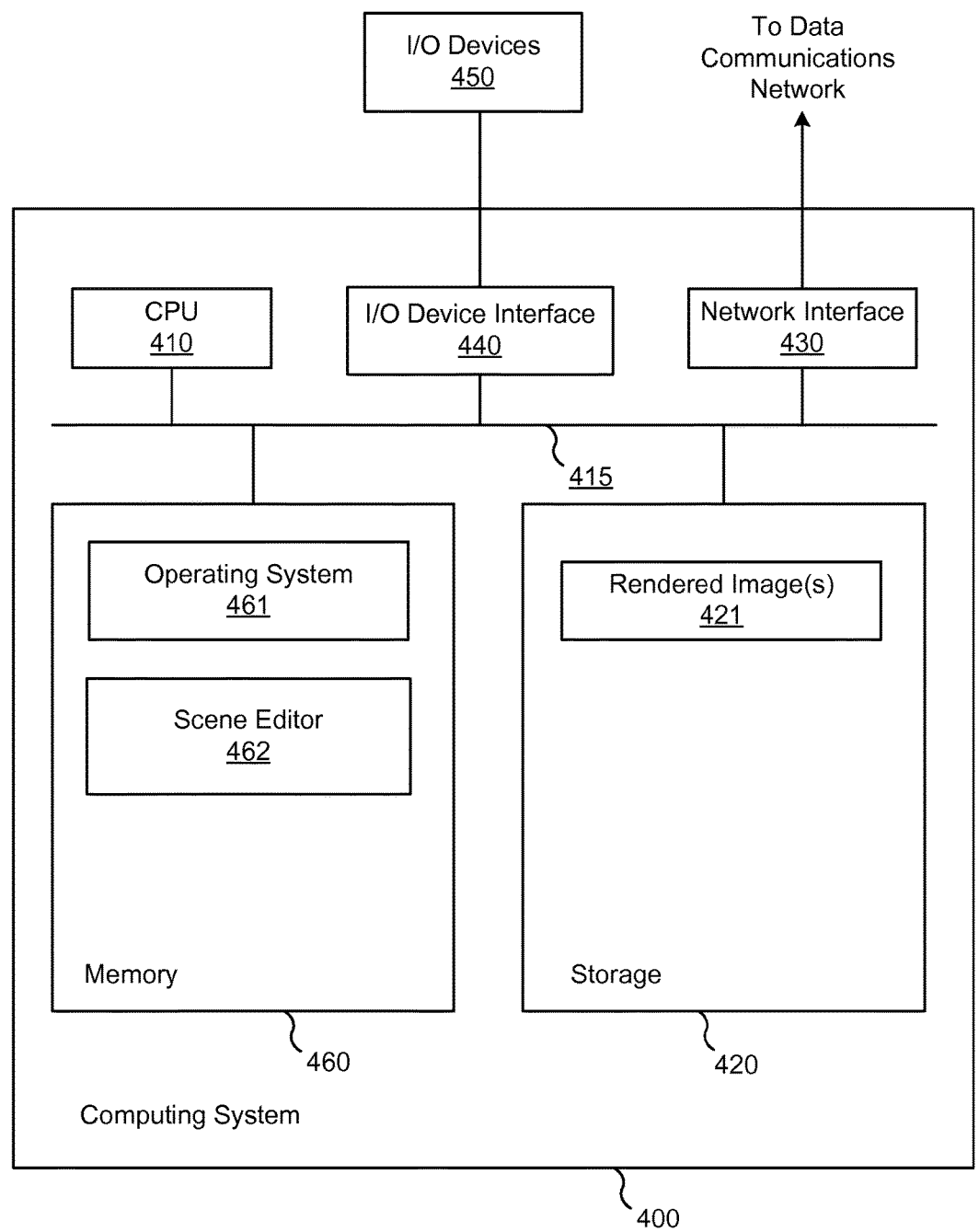
FIG. 4 illustrates a system in which an embodiment may be implemented.

FIG. 4 depicts a block diagram of a system 400 in which an aspect of this disclosure may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, one or more graphics processor units (GPUs), and the like, or some combination of these. And the memory 460 is generally included to be representative of a random access memory. The storage 420 may be a disk drive storage device. Although shown as a single unit, the storage 420 may be a combination of fixed and/or removable storage devices, such as fixed disc drives, floppy disc drives, tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and a scene editor 462. For example, the operating system may be Microsoft Windows®. The scene editor 462 is an application or component thereof that is configured to aggregate elements that are common across shots so that new shots can be created that inherit the common elements, rather than from scratch. In one embodiment, the scene editor 462 may receive a selection of elements common across shots, store the selection of common elements in a scene layer, receive a selection of elements specific to particular shots, and store the specific elements in respective layers associated with the particular shots, according to the method 300 discussed above with respect to FIG. 3. A renderer, which may be part of the same application or separate from the scene editor 462, may then render image frames for each of the shots based on the stored common elements and the stored elements specific to the shot.

Advantageously, techniques disclosed herein permit elements common to a scene to be aggregated in a scene layer. As a result, new shots in the scene may be created that inherit the common elements from the scene layer, without having to create the shot from scratch or manually copy elements from one shot to another. Images running over time, such as the image frames and shots of a film, typically share common elements. Accordingly, the scene layer is a useful abstraction mechanism to aggregate common elements, unlike traditional approaches in which elements are individually created or copied for each shot that is handled separately rather than as part of a larger whole (e.g., a scene). In addition, changes to the scene layer may also be propagated to all related shots, so that the user does not need to manually copy and paste changed elements from one shot to another even after the shots are created.

Reference is made herein to embodiments of the invention. However, it should be understood that the invention is not limited to specific described embodiments. Instead, any combination of the described features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the foregoing is directed to embodiments of the present invention, other and further embodiments of the invention may be devised without departing from the basic scope thereof, and the scope thereof is determined by the claims that follow.

What is claimed is:

1. A computer-implemented method to facilitate content development by rendering image frames of three-dimensional (3D) geometry based on both shot-specific elements and common elements across different shots, the computer-implemented method comprising:
   responsive to receiving, via a user interface, a selection of elements common to a plurality of shots of a scene, updating a scene layer of the scene to store the selected common elements, wherein each shot is distinct and includes multiple image frames from a continuous run of a respective virtual camera, wherein the scene includes a collection of shots with at least a character and a locale in common, wherein at least one common element type, selected from model activation, character blocking, rough lighting, sets, set-ups, model attributes, and metadata, is includable in the common elements;
   subsequent to receiving the selection of common elements, propagating the selected common elements to each of the plurality of shots by operation of one or more computer processors and without requiring, for each shot, user input explicitly specifying to apply the selected common elements to the respective shot, thereby facilitating development of the plurality of shots for rendering the image frames;
   responsive to receiving, via the user interface and for at least one of the plurality of shots, a selection of elements specific to the shot, updating a respective shot layer of the shot to store the elements specific to the shot, wherein the respective shot layer is distinct from the scene layer, wherein the elements specific to the shot include (i) a virtual camera property of the shot and (ii) a shot-specific change to at least one of the selected common elements, wherein the elements specific to the shot are unpropagated to any other shot; and rendering image frames in each of the shots based on the propagated common elements and based further on the unpropagated elements specific to the shot, wherein the image frames are output.

2. The computer-implemented method of claim 1, further comprising:

generating one or more new shot layers based on markers in a storyboard, wherein the one or more new shot layers are associated with the scene layer and inherit the common elements in the scene layer.

3. The computer-implemented method of claim 1, wherein the user interface depicts a timeline of the shots relative to one another.

4. The computer-implemented method of claim 1, wherein the common elements and the plurality of shots are selected based on user input and prior to automatically propagating the common elements to each of the plurality of shots;

wherein the selected common elements, including subsequent changes thereto, are automatically propagated to each of the plurality of shots without requiring, for each shot, user input explicitly specifying to apply the selected common elements to the respective shot, beyond user input specifying the selection of the common elements.

5. The computer-implemented method of claim 4, wherein the scene layer is configured to only store common elements to be automatically propagated to each of the plurality of shots;

wherein each shot layer is configured to only store specific elements pertaining to the respective shot of the respective shot layer, wherein the specific elements are not propagated to any other shot;

wherein the scene layer of the scene does not include the elements specific to the shot, wherein the shot layer of the shot does not include the selected common elements.

6. The computer-implemented method of claim 5, further comprising:

generating one or more new shot layers based on predefined markers in a storyboard, wherein the one or more new shot layers are associated with the scene layer and inherit the common elements in the scene layer, wherein the predefined markers define beginning and ending frames of shots, wherein the markers are predefined based on user input.

7. The computer-implemented method of claim 6, wherein the user interface depicts a timeline of the shots relative to one another, wherein the user interface permits, for each of the shots, selection of virtual camera properties and selection of shot-specific changes.

8. The computer-implemented method of claim 7, wherein the one of the shot layers further stores a plurality of virtual camera parameters including virtual camera position, virtual camera orientation, virtual camera lens type, virtual camera focal ratio, and virtual camera focal length, wherein the image frames are rendered based on at least the plurality of virtual camera parameters.

9. The computer-implemented method of claim 8, wherein the user interface comprises a graphical user interface of a scene editor component of a film editing application, wherein the film editing application includes at least one component selected from a viewer component, a blocking editor, and a timeline tool.

10. The computer-implemented method of claim 9, wherein the viewer component is configured to permit viewing the scene through one or more virtual cameras, wherein the blocking editor is configured to permit modification of character blocking in the scene, wherein the timeline tool is configured to permit moving a playhead through multiple shots.

11. The computer-implemented method of claim 10, wherein the film editing application includes the viewer component, the blocking editor, and the timeline tool.

12. The computer-implemented method of claim 1, wherein the selected common elements, including subsequent changes thereto, are automatically propagated to each of the plurality of shots.

13. A non-transitory computer-readable medium storing a program executable to perform an operation to facilitate content development by rendering image frames of three-dimensional (3D) geometry based on both shot-specific elements and common elements across different shots, the operation comprising:

responsive to receiving, via a user interface, a selection of elements common to a plurality of shots of a scene, updating a scene layer of the scene to store the selected common elements, wherein each shot is distinct and includes multiple image frames from a continuous run of a respective virtual camera, wherein the scene includes a collection of shots with at least a character and a locale in common, wherein at least one common element type, selected from model activation, character blocking, rough lighting, sets, set-ups, model attributes, and metadata, is includable in the common elements;

subsequent to receiving the selection of common elements, propagating the selected common elements to each of the plurality of shots by operation of one or more computer processors when executing the program and without requiring, for each shot, user input explicitly specifying to apply the selected common elements to the respective shot, thereby facilitating development of the plurality of shots for rendering the image frames;

responsive to receiving, via the user interface and for at least one of the plurality of shots, a selection of elements specific to the shot, updating a respective shot layer of the shot to store the elements specific to the shot, wherein the respective shot layer is distinct from the scene layer, wherein the elements specific to the shot include (i) a virtual camera property of the shot and (ii) a shot-specific change to at least one of the selected common elements, wherein the elements specific to the shot are unpropagated to any other shot; and rendering image frames in each of the shots based on the propagated common elements and based further on the unpropagated elements specific to the shot, wherein the image frames are output.

14. The non-transitory computer-readable medium of claim 13, wherein the operation further comprises:

generating one or more new shot layers based on markers in a storyboard, wherein the one or more new shot layers are associated with the scene layer and inherit the common elements in the scene layer.

15. The non-transitory computer-readable medium of claim 13, wherein the user interface depicts a timeline of the shots relative to one another.

16. The non-transitory computer-readable medium of claim 13, wherein the selected common elements, including subsequent changes thereto, are automatically propagated to each of the plurality of shots.

17. A system to facilitate content development by rendering image frames of three-dimensional (3D) geometry based on both shot-specific elements and common elements across different shots, the system comprising:
  a processor; and
  a memory, wherein the memory includes an application program configured to perform an operation comprising:
    responsive to receiving, via a user interface, a selection of elements common to a plurality of shots of a scene, updating a scene layer of the scene to store the selected common elements, wherein each shot is distinct and includes multiple image frames from a continuous run of a respective virtual camera, wherein the scene includes a collection of shots with at least a character and a locale in common, wherein at least one common element type, selected from model activation, character blocking, rough lighting, sets, set-ups, model attributes, and metadata, is includable in the common elements;
    subsequent to receiving the selection of common elements, propagating the selected common elements to each of the plurality of shots without requiring, for each shot, user input explicitly specifying to apply the selected common elements to the respective shot, thereby facilitating development of the plurality of shots for rendering the image frames;
    responsive to receiving, via the user interface and for at least one of the plurality of shots, a selection of elements specific to the shot, updating a respective shot layer of the shot to store the elements specific to the shot, wherein the respective shot layer is distinct from the scene layer, wherein the elements specific to the shot include (i) a virtual camera property of the shot and (ii) a shot-specific change to at least one of the selected common elements, wherein the elements specific to the shot are unpropagated to any other shot; and
    rendering image frames in each of the shots based on the propagated common elements and based further on the unpropagated elements specific to the shot, wherein the image frames are output.

18. The system of claim 17, wherein the operation further comprises:
  generating one or more new shot layers based on markers in a storyboard, wherein the one or more new shot layers are associated with the scene layer and inherit the common elements in the scene layer.

19. The system of claim 17, wherein the user interface depicts a timeline of the shots relative to one another.

20. The system of claim 17, wherein the selected common elements, including subsequent changes thereto, are automatically propagated to each of the plurality of shots.

* * * * *